US008448952B2

(12) United States Patent
Serbu et al.

(10) Patent No.: US 8,448,952 B2
(45) Date of Patent: May 28, 2013

(54) VEHICLE WITH ACTIVE-REGENERATIVE SUSPENSION

(75) Inventors: Liviu Serbu, Woodbridge (CA);
Chandra S. Namuduri, Troy, MI (US);
Christopher J Mettrick, Whitby (CA);
Joseph K Moore, Whitby (CA)

(73) Assignee: GM Global Technology Operations LLC, Detroit, MI (US)

( * ) Notice: Subject to any disclaimer, the term of this patent is extended or adjusted under 35 U.S.C. 154(b) by 20 days.

(21) Appl. No.: 13/118,922

(22) Filed: May 31, 2011

(65) Prior Publication Data

US 2012/0306170 A1 Dec. 6, 2012

(51) Int. Cl.
*B60G 17/04* (2006.01)
*F16F 15/03* (2006.01)

(52) U.S. Cl.
USPC .................. 280/5.515; 188/267; 188/316

(58) Field of Classification Search
USPC ............ 280/5.514, 5.515, 124.157; 188/267, 188/266.1, 316, 317, 318
See application file for complete search history.

(56) References Cited

U.S. PATENT DOCUMENTS

| | | | |
|---|---|---|---|
| 3,559,027 A | 1/1971 | Arsem | |
| 3,861,487 A | 1/1975 | Gill | |
| 3,911,829 A | 10/1975 | Ross et al. | |
| 3,981,204 A | 9/1976 | Starbard | |
| 4,032,829 A | 6/1977 | Schenavar | |
| 4,113,047 A | 9/1978 | Turner | |
| 4,295,538 A | 10/1981 | Lewus | |
| 4,387,781 A | 6/1983 | Ezell et al. | |
| 4,544,868 A | 10/1985 | Murty | |
| 4,815,575 A | 3/1989 | Murty | |
| 4,892,328 A | 1/1990 | Kurtzman et al. | |
| 4,967,359 A | 10/1990 | Sugasawa et al. | |
| 5,027,048 A | 6/1991 | Masrur et al. | |
| 5,036,934 A | 8/1991 | Nishina et al. | |
| 5,091,679 A | 2/1992 | Murty et al. | |
| 5,277,281 A | 1/1994 | Carlson et al. | |
| 5,434,782 A * | 7/1995 | Henry .............. | 701/37 |
| 5,573,088 A | 11/1996 | Daniels | |
| 5,667,715 A | 9/1997 | Foister | |
| 5,878,997 A | 3/1999 | Miesner | |
| 6,390,252 B1 | 5/2002 | Namuduri et al. | |
| 6,641,166 B2 | 11/2003 | Browne et al. | |
| 6,920,951 B2 * | 7/2005 | Song et al. .................. | 180/165 |
| 7,087,342 B2 * | 8/2006 | Song et al. .................. | 429/48 |
| 7,624,850 B2 | 12/2009 | Namuduri et al. | |
| 8,127,900 B2 * | 3/2012 | Inoue .................. | 188/267 |
| 2003/0079948 A1 | 5/2003 | Jolly et al. | |
| 2004/0040805 A1 | 3/2004 | Bailey | |
| 2005/0121269 A1 | 6/2005 | Namuduri | |
| 2008/0129133 A1 * | 6/2008 | Taube et al. .................. | 310/80 |
| 2009/0121398 A1 * | 5/2009 | Inoue .................. | 267/140.14 |
| 2012/0013277 A1 * | 1/2012 | Ogawa .................. | 318/368 |

* cited by examiner

*Primary Examiner* — Drew Brown
(74) *Attorney, Agent, or Firm* — Ingrassia Fisher & Lorenz, P.C.

(57) ABSTRACT

In accordance with an exemplary embodiment, an active suspension system having a regenerative actuator is provided for an electric or hybrid electric vehicle. The system comprises a drive system including a battery mounted to a chassis and a controller coupled to the drive system. The controller also couples to a suspension system between the chassis and at least one wheel of the vehicle. The suspension system includes an actuator having an electric motor providing energy by converting linear movement of a ball screw into rotational movement of a rotor having a hollow core permitting at least a portion of the ball screw to translate within the rotor during operation of the actuator.

19 Claims, 6 Drawing Sheets

VEHICLE WITH ACTIVE-REGENERATIVE SUSPENSION

TECHNICAL FIELD

The technical field generally relates to systems and methodologies for a suspension system for vehicles, and more particularly, to an active suspension system having a regenerative actuator.

BACKGROUND

Vehicles typically include a suspension system that responds to bumps, holes and other imperfections in the roadway so as to prevent such disturbances from being significantly transferred to the passenger compartment of the vehicle. Conventional vehicle suspension systems typically include a damping mechanism that provides a resistive force proportional to the relative translational velocity between the vehicle chassis and the wheels. Active suspension systems generally implement the damping mechanism via an actuator capable of providing energy to the suspension in response to a real time control system to generate resistive forces between the vehicle chassis and the wheels in an active manner. Accordingly, active suspension systems are energy consuming systems, which in an electric or hybrid electric vehicle become one more system that must be powered by the battery system of the vehicle.

Accordingly, it is desirable to provide an active suspension system for a vehicle that produces energy when road conditions permit. Also, it is desirable to provide an active suspension system for a electric vehicle that can be implemented in a compact size for application across a wide array of vehicle body types. Additionally, other desirable features and characteristics of the present invention will become apparent from the subsequent description taken in conjunction with the accompanying drawings and the foregoing technical field and background.

BRIEF SUMMARY

In accordance with an exemplary embodiment, an active suspension system having a regenerative actuator is provided for a vehicle. The system comprises a drive system including a battery mounted to a chassis and a controller coupled to the drive system. The controller also couples to a suspension system between the chassis and at least one wheel of the vehicle. The suspension system includes an actuator having an electric motor providing energy by converting linear movement of a ball screw into rotational movement of a rotor having a hollow core permitting at least a portion of the ball screw to translate within the rotor during operation of the actuator.

In accordance with an exemplary embodiment, an active suspension system having a regenerative actuator is provided for a vehicle. The system comprises a drive system including a battery mounted to a chassis and a controller coupled to the drive system. The controller also couples to a suspension system between the chassis and at least one wheel of the vehicle. The suspension system has an actuator including an electric motor having a stator and a rotor having a hollow core at one end of the actuator and an air spring at the other end. Also included is a linear motion to rotational motion converting mechanism that includes a ball nut coupled to the rotor and receiving a ball screw causing the ball nut to rotate the rotor within the stator while the ball screw translates within the hollow core of the rotor.

In accordance with an exemplary embodiment, an active suspension system having a regenerative actuator is provided for a vehicle. The system comprises a drive system including a battery mounted to a chassis and a controller coupled to the drive system. The controller also couples to an active regenerative suspension system between the chassis and at least one wheel of the vehicle. The suspension system has an actuator including an electric motor having a stator and a rotor having a hollow core at one end of the actuator and an air spring at the other end. Also included is a linear motion to rotational motion converting mechanism having a ball screw with a grooved member positioned at one end thereof for reducing friction as the ball screw translates within the hollow core of the rotor, which rotates a ball nut on a radial bearing to rotate the rotor within the stator to provide energy while the ball screw translates within the hollow core of the rotor.

DESCRIPTION OF THE DRAWINGS

The inventive subject matter will hereinafter be described in conjunction with the following drawing figures, wherein like numerals denote like elements, and.

DETAILED DESCRIPTION

The following detailed description is merely exemplary in nature and is not intended to limit the subject matter of the disclosure or its uses. Furthermore, there is no intention to be bound by any expressed or implied theory presented in the preceding technical field, background, brief summary or the following detailed description.

The following description refers to elements or features being "connected" or "coupled" together. As used herein, "connected" may refer to one element/feature being directly joined to (or directly communicating with) another element/feature, and not necessarily mechanically. Likewise, "coupled" may refer to one element/feature being directly or indirectly joined to (or directly or indirectly communicating with) another element/feature, and not necessarily mechanically. However, it should be understood that, although two elements may be described below, in one embodiment, as being "connected," in alternative embodiments similar elements may be "coupled," and vice versa. Thus, although the schematic diagrams shown herein depict example arrangements of elements, additional intervening elements, devices, features, or components may be present in an actual embodiment. It should also be understood that FIGS. 1-11 are merely illustrative and may not be drawn to scale.

Figure 1:
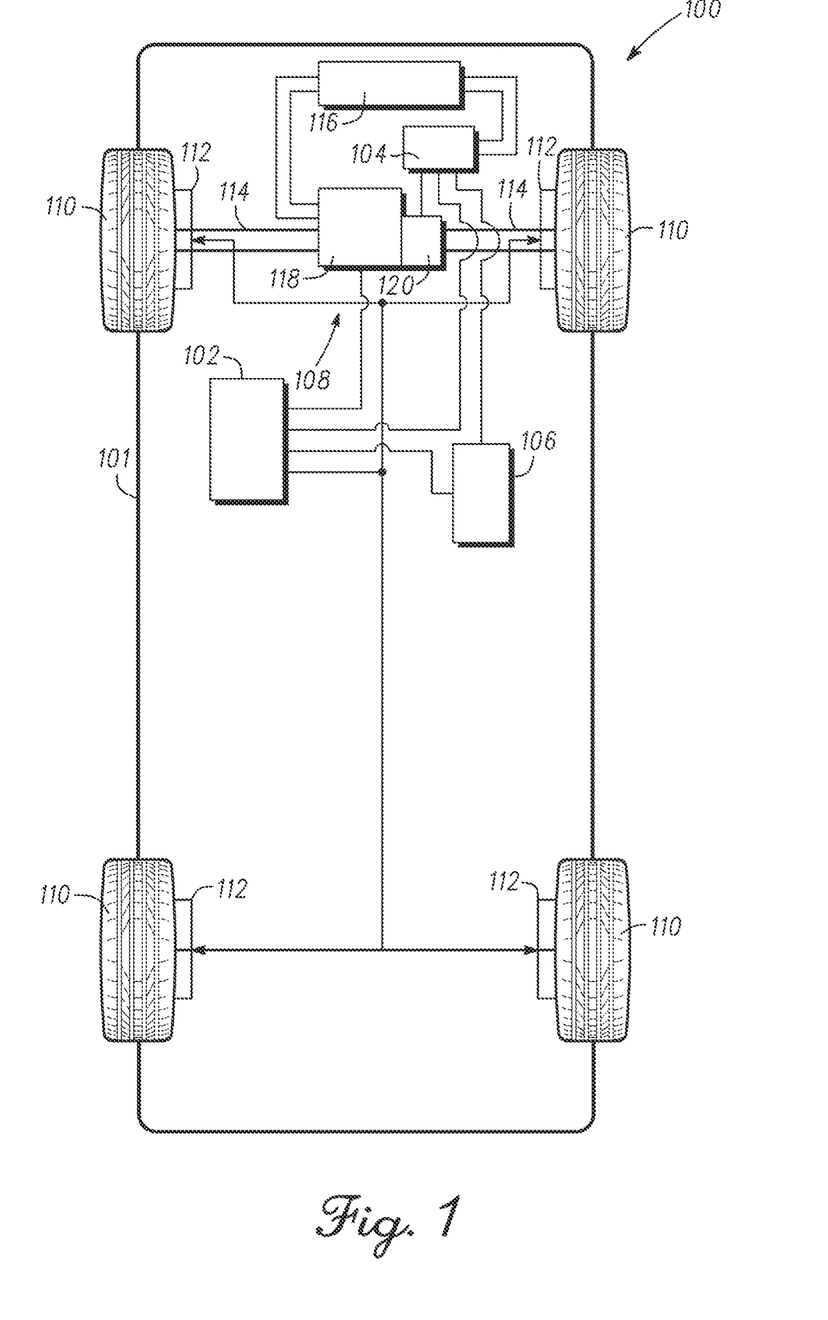
FIG. 1 is an illustration of a vehicle suitable for using exemplary embodiments of the present disclosure.

FIG. 1 is a simplified schematic representation of an embodiment of a vehicle 100 according to the present disclosure. Although vehicle 100 is illustrated as a hybrid electric vehicle (HEV), the techniques and concepts described herein are also applicable to internal combustion or other vehicles. The illustrated embodiment of vehicle 100 includes, without limitation: a chassis 101; a vehicle control module 102 coupled to a power converter assembly (e.g., an inverter or inverter assembly) 104; an onboard energy storage system 106; a propulsion system 108 driving wheels 110 (front wheel drive illustrated); and an active regenerative suspension system 112 for each wheel.

The propulsion system 108 includes a combustion engine 118 and an electric motor/generator (or motor) 120. As will be appreciated, the electric motor 120 includes a transmission therein, and although not illustrated also includes a stator assembly (including conductive coils), a rotor assembly (including a ferromagnetic core), and a cooling fluid (i.e., coolant). The stator assembly and/or the rotor assembly within the electric motor 120 may include multiple electromagnetic poles (e.g., sixteen poles), as is known. The combustion engine 118 and/or the electric motor 120 are integrated such that one or both are mechanically coupled to at least some of the wheels 110 through one or more drive shafts 114 (front wheel drive illustrated). In one embodiment, the automobile 100 is a "series HEV," in which the combustion engine 118 is not directly coupled to the transmission, but coupled to a generator (not shown), which is used to power the electric motor 120. In another embodiment, the automobile 100 is a "parallel HEV," in which the combustion engine 118 is directly coupled to the transmission by, for example, having the rotor of the electric motor 120 rotationally coupled to the drive shaft of the combustion engine 118. Together, the propulsion system 108, the converter 104 and the battery 106 form a drive system for the vehicle 100.

A radiator 116 is connected to the chassis 101 at an outer portion thereof and although not illustrated in detail, includes multiple cooling channels therein that contain a cooling fluid (i.e., coolant) such as water and/or ethylene glycol (i.e., "antifreeze") and is coupled to the engine 118 and the inverter 104. Although the discussion below refers to the power converter assembly 104 as a direct current-to-alternating current (DC/AC) inverter (i.e., a DC-to-AC inverter), it should be understood that in other embodiments, aspects of the present invention may be used in conjunction with direct current-to-direct current (DC/DC) converters, as will be appreciated by those skilled in the art.

The vehicle control module 102 may include any type of processing element or vehicle controller, and may be equipped with nonvolatile memory, random access memory (RAM), discrete and analog input/output (I/O), a central processing unit, and/or communications interfaces for networking within a vehicular communications network. In an electric vehicle embodiment, onboard generator 104 may comprise a small gas (or other liquid fuel) powered generator sufficient to charge the energy storage system 106 if needed. In a hybrid electric vehicle embodiment, generator 104 may be powered by or part of the vehicle gas (or other fuel) engine used to propel the vehicle. Onboard energy storage system 106 may be realized as a rechargeable battery pack having a single battery module or any number of individual battery modules. Onboard energy storage system 106 provides electrical energy that enables electric propulsion system 108 to provide traction power to wheels 110. Together, the energy storage system 106 and electric propulsion system 108 provides a drive system to propel the vehicle 100.

While FIG. 1 is a schematic diagram that depicts various electrical and mechanical connections and couplings in a very simplified manner for ease of description, an actual embodiment of vehicle 100 will of course utilize additional physical components and devices that are well known in the automotive industry. For example, numerous conventional accessories would be included in a commercially available vehicle such as window or mirror defoggers, anti-lock brake systems, lighting systems, warning systems (e.g., horn), turn indicators (signals), air conditioning, heated seats, video/audio systems, and power outlet ports for user devices (collectively, accessories). Also, the vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD), or all-wheel drive (AWD). The vehicle 100 may also incorporate any one of, or combination of, a number of different types of engines, such as, for example, a gasoline or diesel fueled combustion engine, a flex fuel vehicle (FFV) engine (i.e., an engine that uses a mixture of gasoline and alcohol) or a gaseous compound (e.g., hydrogen and/or natural gas) fueled engine.

According to various embodiments and features of the present disclosure, the suspension system 112 comprises an active regenerative suspension system. An active suspension system generally implements a damping mechanism via an actuator capable of providing energy to the suspension in response to the vehicle control module 102 to generate resistive forces between the vehicle chassis 101 and the wheels 110 in order to meet certain ride and vehicle attitude criteria in an active manner. Such criteria may include vehicle body control, cornering and handling, tire road holding for safety, and variable damping control to offer a smooth ride for the convenience of the vehicle passengers. In exemplary embodiments, the suspension system 112 is also configured to generate energy during operation of the actuator of the suspension system 112 as will be explained in detail below. Accordingly, the active regenerative suspension system of the present disclosure is not strictly an energy consuming system, but also an energy generating system that can provide energy for recharging the battery(ies) of the energy storage system 106.

Figure 2:
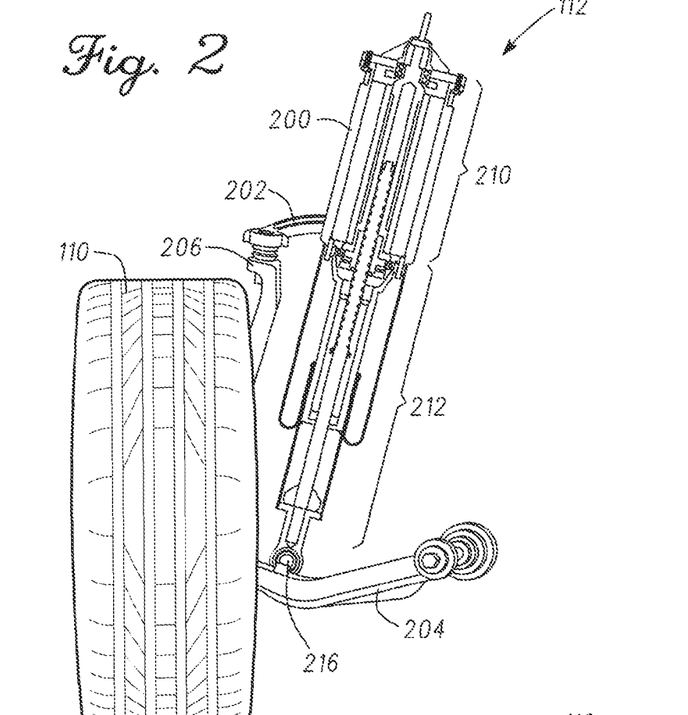
FIGS. 2-3 are perspective views of the suspension system of the vehicle of FIG. 1.
Figure 3:
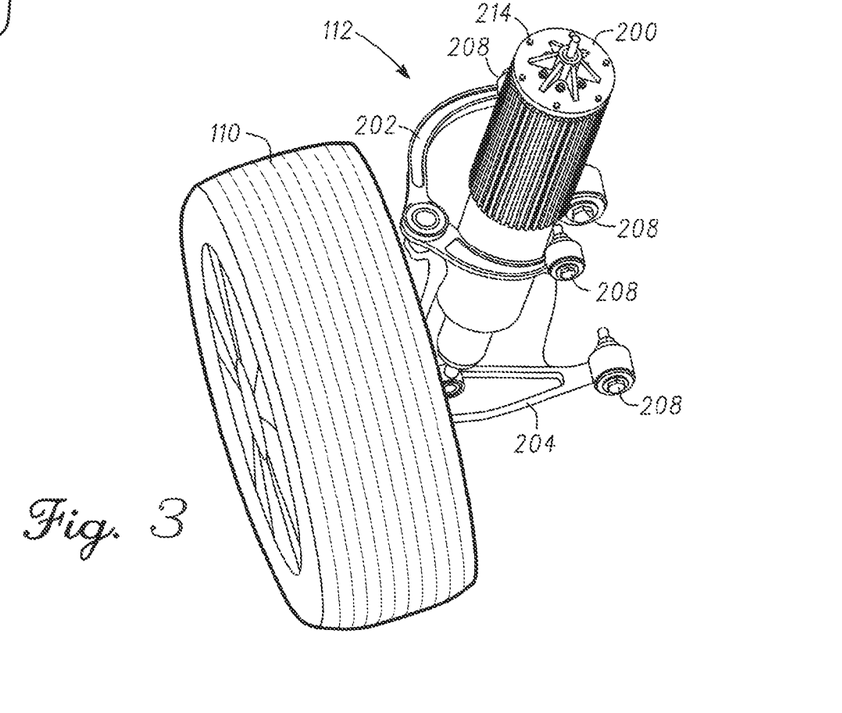

FIGS. 2-3 are perspective views of the suspension system 112 of FIG. 1. The suspension system 112 includes an actuator 200 that is coupled between the chassis (101 of FIG. 1) and the wheel(s) 110. Generally, the chassis is commonly referred to as a sprung mass, while the wheel and mounting assembly are commonly referred to as an unsprung mass. As illustrated, the wheel 110 couples to the chassis and actuator 200 by an upper control arm 202, a lower control arm 204 and a mounting member 206 (which is commonly referred to as the knuckle). The upper control arm 202 and lower control arm 204 couple to the chassis at connection points 208, while the actuator couples to the lower control arm 204 via a lower mounting member 216 and to the chassis at an upper mounting member 214.

Generally, the actuator 200 includes an upper portion 210 having an electric motor and a lower potion 212 where an air spring (or a coil spring in alternate embodiments) is positioned. Having the electric motor positioned on the upper portion 210 of the actuator provides the greater mass of the actuator 200 to be coupled to the sprung mass of the vehicle (100 of FIG. 1), however, the positions of the electric motor and air spring could be reversed in alternate embodiments.

Figure 4:
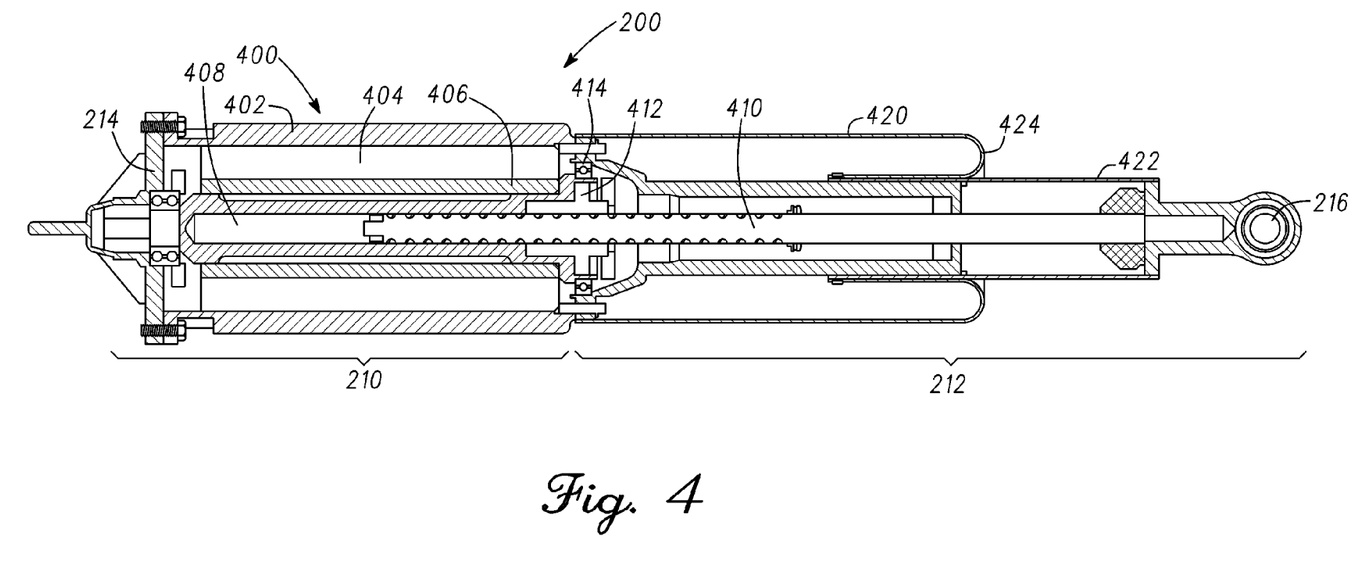
FIG. 4 is an illustration of the actuator of FIGS. 2-3.

Referring now to FIG. 4, there is shown a cross-sectional illustration of the actuator 200 of FIGS. 2-3. As noted above, the upper portion 210 of the actuator 200 includes an electric motor 400 that includes a motor housing 402, a stator 404 and a rotor 406. In exemplary embodiments, the rotor 406 includes a permanent magnet having a hollow core 408 that permits a ball screw 410 to translate (move into and out of) the rotor 406. Permitting the ball screw 410 to translate within the rotor assembly allows for more compact design of the actuator 200, which facilitates its use with a greater variety of vehicle types. The lower portion 212 of the actuator 200 includes an air spring 420, which may be formed of reinforced rubber as is known in the art. The air spring 420 includes a guiding surface 422 that translates (moves) within the air spring 420 at a rolling edge 424, which is positioned downward (See FIG. 2) to inhibit debris from interfering with the operation of the air spring.

Operationally, the actuator 200 includes a linear motion to rotational motion conversion mechanism that includes the ball screw 410 that is received by a ball nut 412 that is coupled to the rotor 406. Thus, the linear movement of the ball screw is converted to rotational movement of the rotor 406 within the stator 404 by the ball nut rotating within a radial bearing 414 that connects to the actuator 200. During active suspension operation, the vehicle control module 102 (FIG. 1) provides energy from the battery to the stator 404 of the electric motor 400. The field created by the energy resists rotor 406 rotation, which stiffens (increases resistance) the actuator and reduces acceleration between the wheels 100 and the chassis 101 (FIG. 1). In regenerative operation, rotation of the rotor 406 (or more precisely, the permanent magnet of the rotor) within the stator 404 provides energy that the vehicle control module 102 (FIG. 1) can direct to the energy storage system 106 (FIG. 1) to recharge the battery(ies).

Figure 5:
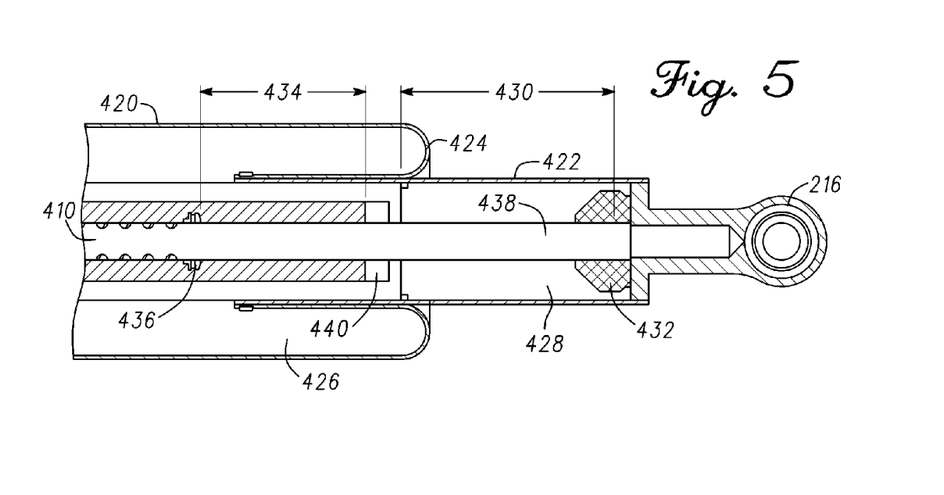
FIGS. 5-7 are illustrations of the lower portion of the actuator of FIG. 4.
Figure 6:
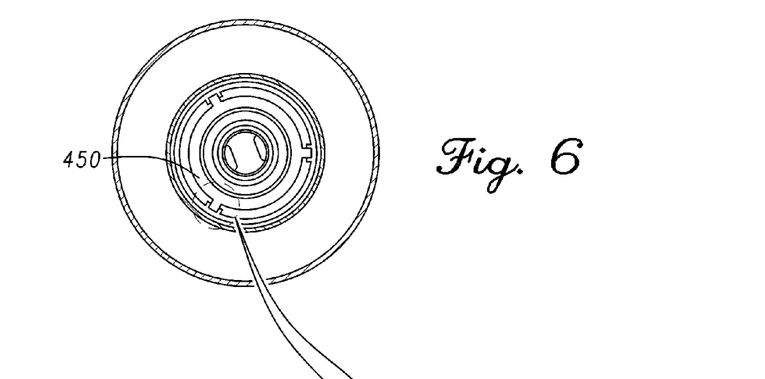
Figure 7:
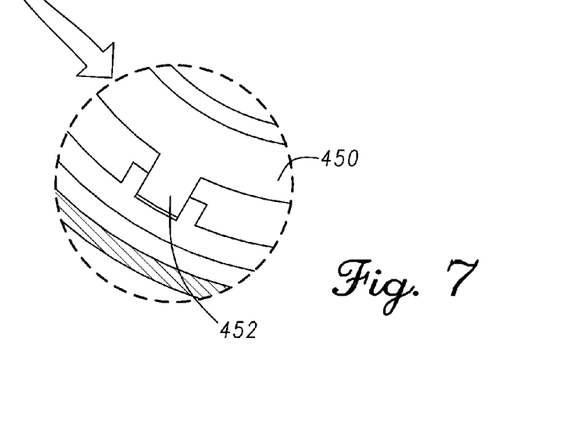

FIGS. 5-7, show more detailed illustrations of the lower portion 212 of the actuator 200. In FIG. 5, the air spring 420 is shown to define a first air volume space 426 under the air spring 420 surface and a second air volume space 428 under the air spring guide 422 surface. The dual air volume embodiment provides the advantage of an increased air volume of the air spring. Since an air spring rate is proportional with the volume, the spring force is directly proportional with its volume. Accordingly, the force capability of the air spring 420 of the present disclosure is increased within the same packaging space as compared to a conventional mono-air-volume air spring.

Jounce travel 430 of the actuator 200 is limited by a jounce bumper 432, which typically comprises an elastomeric material. Rebound travel 434 is limited by a rebound bumper 436, which also may be made of an elastomeric material. The jounce travel 430 and rebound travel 434 define the length of the linear translation (movement) of the actuator 200, which in turn, causes the ball screw 410 to rotate the ball nut as will be fully explained below. The exemplary embodiments include a cylindrical portion (i.e., not threaded) 438 of the ball screw that passes through a guide and seal 440. The guide and seal guides the cylindrical portion 438 in a linear manner and inhibits air spring air pressure from escaping via the threads of the ball screw.

FIG. 6 is a cross-sectional plan view of the actuator 200, which illustrates an actuator tube which includes guide member 450 having a plurality (three shown in this example) of guide pins 542 (FIG. 7) that are preferably equally spaced (in a radial sense) around the diameter. The guide pins slide within grooves cut into the guiding surface 422 and permit only linear movement between the actuator tube and the guiding surface. The purpose of this linear constraint is to transmit twisting forces in the lead screw to the actuator case and then to the upper portion of the actuator (210). This torque will cancel the reaction torque in the stator 404 when the vehicle control module 102 (FIG. 1) provides energy from the battery 106 to the stator 404. Without the guide member 450, the twisting forces within the actuator would transfer torque to the attachment points of the actuator to the vehicle chassis (i.e., the unsprung mass at the upper mounting member 214 and the sprung mass at the lower mounting member 216), which generally results in parasitic torque steer in the unsprung mass.

Figure 8:
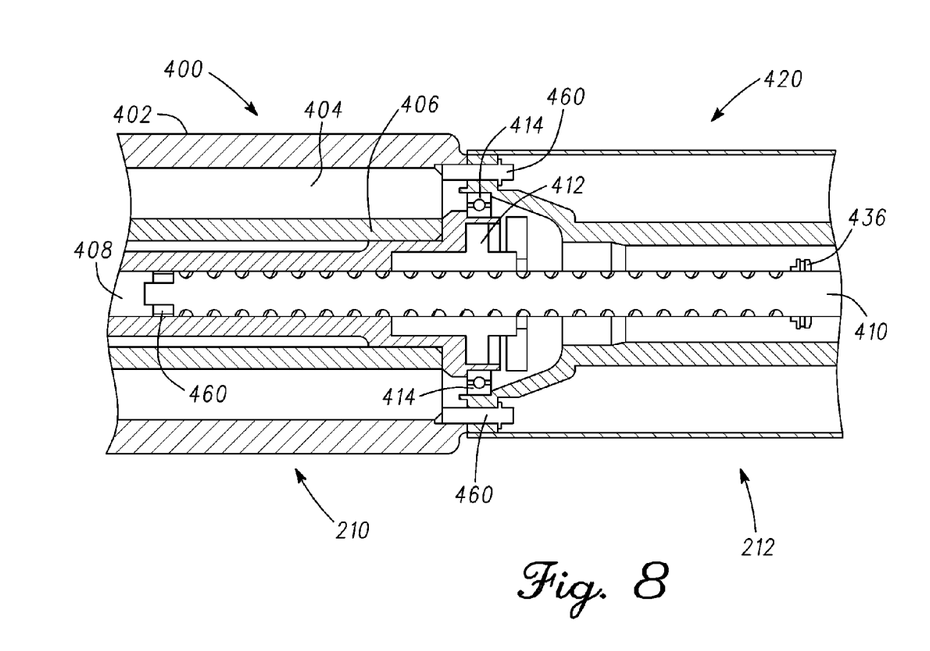
FIGS. 8-9 are illustrations of the linear motion to rotational motion conversion mechanism of the actuator of FIG. 4.
Figure 9:
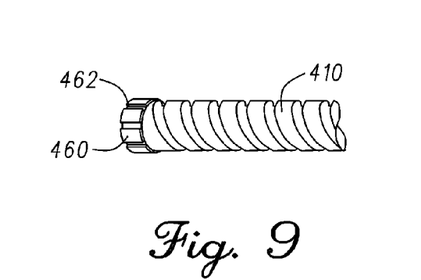

FIGS. 8-9 are more detailed cross-sectional illustrations of the linear motion to rotational motion conversion mechanism of the actuator 200. As can be seen, the upper portion 210 and the lower portion 212 are coupled by fasteners 460 that bring the ball screw of the lower portion 212 into operational contact with the ball nut 412 and rotor 406 of the electric motor 400. The ball nut 412 receives (in a mating thread manner) the ball screw 410 providing the rotation of the rotor 406 from linear translation of the ball screw 410. To facilitate compact implementation, the rotor 406 is provided with a hollow core 408 into which the ball screw 410 translates (moves into and out of) during operation.

At one end, the ball screw 410 is provided with a guide member 460 that is grooved 464 (FIG. 9) to facilitate air movement past the guide 460. This reduces air pressure as air is allowed to pass through the grooves 462 and may travel along the threads (or tracks) of the ball screw 410. Reduced air pressure promotes easier translation and more free rotation of the ball nut 412 (and thus the rotor 406). To further promote free rotation of the ball nut 412, a radial bearing 414 is provided for the ball nut 412 for a further reduction of frictional losses during operation. The more freely the rotor is able to rotate within the stator 404, the more energy can be generated to aid in recharging the battery(ies) of the vehicle 100 (FIG. 1).

Figure 10:
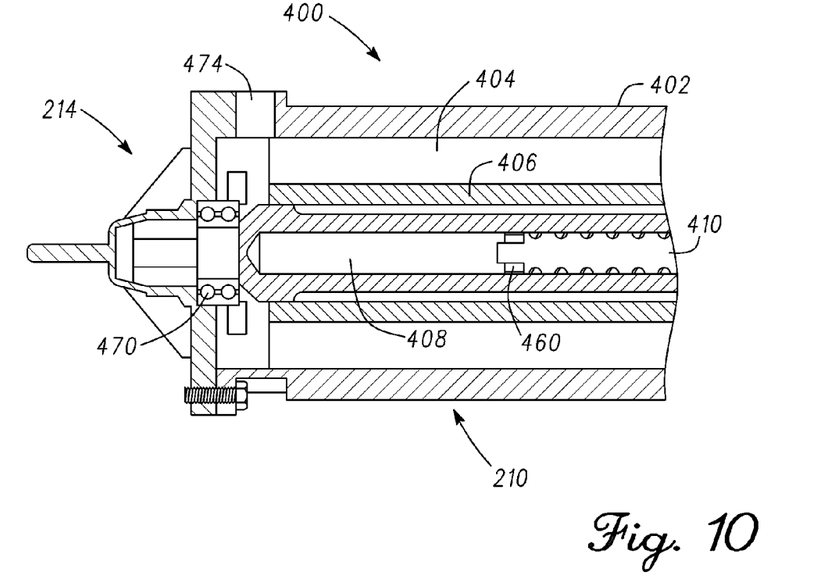
FIGS. 10-11 are illustrations of the upper portion of the actuator of FIG. 4.
Figure 11:
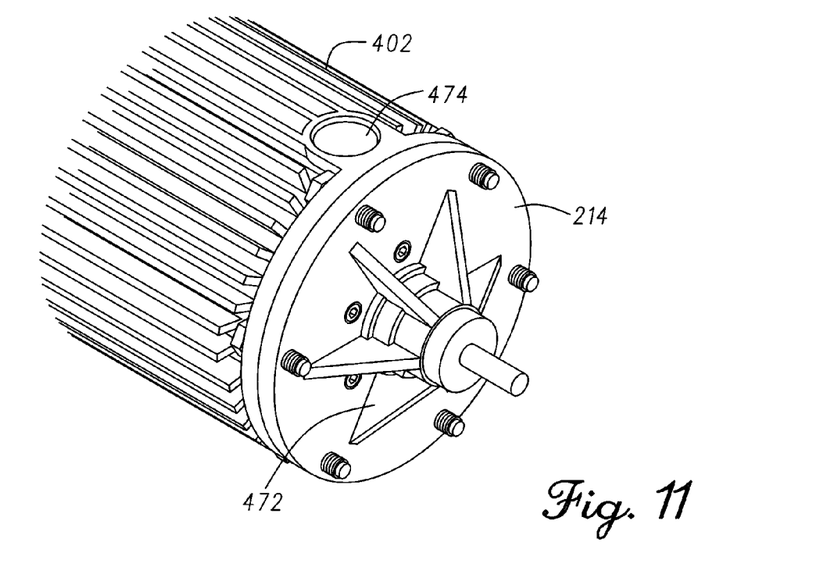

FIGS. 10-11, are more detailed illustrations of the upper portion 210 of the actuator 200. In addition to the radial bearing 414 (FIG. 8) that supports the ball nut 412 (and thus, one end of the rotor 406), an opposite end of the rotor 406 is supported by a thrust bearing 470, which also promotes free rotation of the rotor 406 within the stator 404. As mentioned above, an upper mounting member 214 couples the actuator 200 to the chassis (101 of FIG. 1) so that the greater mass of the actuator 200 is coupled to the sprung mass of the vehicle 100 (FIG. 1). In exemplary embodiments, the upper mounting member 214 is provided with a plurality of fins 472 (five shown in this example), which facilitates torque reaction transfer from the actuator 200 to the chassis 101. The fins and the upper mounting member are connected to the chassis via an elastomeric mount (not shown) that transmits loads from the actuator to the body while isolating metallic parts to maintain a quite suspension operation. The fins allow the mount to have high rotational stiffness and low translational (in the longitudinal axis of the actuator) stiffness. High rotational stiffness is advantageous to get fast response from the actuator and low translational stiffness is advantageous to absorb the energy from very small bumps in the road. Finally, a connection port 474 is provided to couple the actuator 200 to the vehicle control module 102 (FIG. 1) so that energy can be transferred to the actuator or taken from it to recharge the battery(ies) 106 (FIG. 1).

Accordingly, an active regenerative suspension system is provided that offers multiple advantages over conventional active suspensions, including but not limited to, resistance to debris intrusion, compact implantation and free rotor rotation offering energy producing capability that can support the energy storage system of an electric or hybrid electric vehicle.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing summary and detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A vehicle, comprising:
a drive system including a battery mounted to a chassis;
a controller coupled to the drive system and a suspension system coupled between the chassis and at least one wheel, the suspension system including an actuator having an electric motor providing energy by converting linear movement of a ball screw into rotational movement of a rotor having a hollow core permitting at least a portion of the ball screw to translate within the rotor during operation of the actuator; and
a mounting member coupled to the electric motor and having fins providing torque reaction transfer from the actuator to the chassis.

2. The vehicle of claim 1, further comprising a ball nut coupled to the rotor and receiving the ball screw for converting the linear movement of the ball screw into the rotational movement of the rotor permitting at least a portion of the ball screw to translate within the hollow core of the rotor.

3. The vehicle of claim 2, wherein the ball nut is coupled to the actuator by a radial bearing facilitating rotation of the ball nut and rotor.

4. The vehicle of claim 1, wherein the actuator further comprises the electric motor being positioned on an upper portion thereof.

5. The vehicle of claim 1, wherein the controller provides energy from the battery to the electric motor to provide suspension forces between the chassis and the at least one wheel.

6. The vehicle of claim 1, wherein the controller receives energy from the electric motor to recharge the battery.

7. The vehicle of claim 1, wherein the actuator further comprises an air spring positioned on a lower portion thereof.

8. The vehicle of claim 7, wherein the air spring has first and second air volume spaces.

9. The vehicle of claim 7, wherein the air spring includes a downward positioned rolling edge to inhibit debris from interfering with operation of the air spring.

10. The vehicle of claim 7, wherein the actuator further comprises a guide member between the upper portion and the lower portion of the actuator, the guide member limiting translation between the upper portion and the lower portion to longitudinal translation.

11. A vehicle, comprising:
a drive system including a battery mounted to a chassis; and
a controller coupled to the drive system and a suspension system coupled between the chassis and at least one wheel, the suspension system including an actuator having an electric motor providing energy by converting linear movement of a ball screw into rotational movement of a rotor having a hollow core permitting at least a portion of the ball screw to translate within the rotor during operation of the actuator, the ball screw having a grooved member positioned at an end of the ball screw for reducing air pressure as the ball screw translates within the hollow core of the rotor.

12. A vehicle, comprising:
a drive system including a battery mounted to a chassis;
a controller coupled to the drive system and a suspension system coupled between the chassis and at least one wheel, the suspension system including an actuator comprising:
an electric motor having a stator and a rotor having a hollow core;
an air spring;
a linear motion to rotational motion converting mechanism including a ball nut coupled to the rotor and receiving a ball screw, the ball nut rotating the rotor within the stator while the ball screw translates within the hollow core of the rotor; and
a mounting member coupled to the electric motor and having fins providing torque reaction transfer from the actuator to the chassis.

13. The vehicle of claim 12, wherein the ball nut is coupled to the actuator by a radial bearing facilitating rotation of the ball nut and rotor.

14. The vehicle of claim 12, further comprising a grooved member positioned at an end of the ball screw for reducing air pressure as the ball screw translates within the hollow core of the rotor.

15. The vehicle of claim 12, wherein the controller provides energy from the battery to the electric motor to provide suspension between the chassis and the at least one wheel.

16. The vehicle of claim 12, wherein the controller receives energy from the electric motor to recharge the battery.

17. A vehicle, comprising:
a drive system including a battery mounted to a chassis;
a controller coupled to the drive system and an active regenerative suspension system coupled between the chassis and at least one wheel, the active regenerative suspension system including an actuator comprising:
an electric motor having a stator and a rotor having a hollow core;
an air spring;
a linear motion to rotational motion converting mechanism including a ball screw having a grooved member positioned at one end thereof for reducing air friction as the ball screw translates within the hollow core of the rotor, and a ball nut coupled to the rotor and receiving the ball screw, the ball nut rotating on a radial bearing to rotate the rotor within the stator to provide energy while the ball screw translates within the hollow core of the rotor.

18. The vehicle of claim 17, wherein the controller provides energy from the battery to the electric motor to provide suspension between the chassis and the at least one wheel.

19. The vehicle of claim 17, wherein the controller uses the provided energy from to recharge the battery.

* * * * *